(12) United States Patent
Russell et al.

(10) Patent No.: US 9,135,740 B2
(45) Date of Patent: Sep. 15, 2015

(54) ANIMATED MESSAGING

(75) Inventors: Nicholas Russell, Wheelers Hill (AU);
Anton Felich, Wheelers Hill (AU);
James Jenkins, Cornwall (GB)

(73) Assignee: E-CLIPS INTELLIGENT AGENT TECHNOLOGIES PTY. LTD., Wheelers Hill (AU)

( * ) Notice: Subject to any disclaimer, the term of this patent is extended or adjusted under 35 U.S.C. 154(b) by 774 days.

(21) Appl. No.: 12/909,090

(22) Filed: Oct. 21, 2010
(Under 37 CFR 1.47)

(65) Prior Publication Data

US 2012/0030038 A1    Feb. 2, 2012

Related U.S. Application Data

(63) Continuation of application No. 10/522,809, filed as application No. PCT/AU03/00393 on Mar. 31, 2003, now abandoned.

(30) Foreign Application Priority Data

Jul. 31, 2002 (AU) ................................. 2002950502

(51) Int. Cl.
| | | |
|---|---|---|
| G06F 3/048 | (2013.01) | |
| G06T 13/80 | (2011.01) | |
| G06Q 30/02 | (2012.01) | |
| G10L 13/04 | (2013.01) | |
| H04L 12/58 | (2006.01) | |
| G10L 21/10 | (2013.01) | |

(52) U.S. Cl.
CPC ............ G06T 13/80 (2013.01); G06Q 30/0277 (2013.01); G10L 13/043 (2013.01); H04L 12/581 (2013.01); H04L 51/04 (2013.01); G10L 2021/105 (2013.01)

(58) Field of Classification Search
CPC ............ G06F 15/16; G06F 3/00; G06F 3/002
USPC ................................................. 715/839, 861
See application file for complete search history.

(56) References Cited

U.S. PATENT DOCUMENTS

| | | |
|---|---|---|
| 5,111,409 A | 5/1992 | Gasper et al. |
| 5,736,982 A | 4/1998 | Suzuki et al. |

(Continued)

FOREIGN PATENT DOCUMENTS

| | | |
|---|---|---|
| FR | 2807188 | 10/2001 |
| JP | 2000/123191 | 4/2000 |
| WO | 01/46947 | 6/2001 |

OTHER PUBLICATIONS

European Patent Office Communication (EPO Form 2906 01.91TRI) mailed Dec. 24, 2014 for Application No. 03 770 986.2-1853.

(Continued)

*Primary Examiner* — William Bashore
*Assistant Examiner* — Gregory A DiStefano
(74) *Attorney, Agent, or Firm* — Smith, Gambrell & Russell, LLP

(57) ABSTRACT

A method and apparatus that allows an animated interactive talking character to appear on a user's screen when conducting an Instant Messaging (IM) session. The character which is displayed on the user's screen is determined by a profile for the sender of the message. This allows a user to pre-select which character will be displayed on the screen of recipients of the instant messages.

27 Claims, 18 Drawing Sheets

(56) References Cited

U.S. PATENT DOCUMENTS

| | | |
|---|---|---|
| 6,175,842 B1 | 1/2001 | Kirk et al. |
| 6,212,548 B1 | 4/2001 | DeSimone et al. |
| 6,219,045 B1 * | 4/2001 | Leahy et al. ............... 715/757 |
| 6,476,815 B1 | 11/2002 | Ando |
| 6,493,001 B1 | 12/2002 | Takagi et al. |
| 6,784,901 B1 * | 8/2004 | Harvey et al. ............... 715/757 |
| 6,907,571 B2 | 6/2005 | Slotznick |
| 6,910,186 B2 * | 6/2005 | Kim ............... 715/706 |
| 6,961,755 B2 | 11/2005 | Matsuda |
| 7,085,259 B2 | 8/2006 | Wang |
| 7,159,008 B1 | 1/2007 | Wies |
| 7,181,690 B1 | 2/2007 | Leahy |
| 7,246,315 B1 | 7/2007 | Andrieu et al. |
| 2001/0033298 A1 * | 10/2001 | Slotznick ............... 345/758 |
| 2002/0008716 A1 | 1/2002 | Colburn |
| 2002/0083140 A1 | 6/2002 | Shin |
| 2002/0087691 A1 | 7/2002 | Clarke |
| 2002/0097266 A1 | 7/2002 | Hachiya et al. |
| 2002/0184089 A1 | 12/2002 | Tsou |
| 2003/0005062 A1 | 1/2003 | Hachiya et al. |
| 2003/0011643 A1 | 1/2003 | Nishihata |
| 2003/0154446 A1 | 8/2003 | Constant |
| 2004/0030596 A1 | 2/2004 | Attar et al. |
| 2004/0030741 A1 * | 2/2004 | Wolton et al. ............... 709/202 |
| 2004/0075677 A1 | 4/2004 | Loyall et al. |
| 2004/0201624 A1 * | 10/2004 | Crawford ............... 345/751 |
| 2005/0188018 A1 | 8/2005 | Endo et al. |
| 2008/0284779 A1 * | 11/2008 | Gu et al. ............... 345/419 |

OTHER PUBLICATIONS

International Preliminary Examination Report issued for the related PCT Patent application No. PCT/AU2003/000393 mailed Dec. 8, 2004.

* cited by examiner

ANIMATED MESSAGING

CROSS-REFERENCE TO RELATED APPLICATION

This application is a continuation of U.S. patent application Ser. No. 10/522,809 filed Jan. 31, 2005 now abandoned, which is the national stage entry of International Application No. PCT/AU2003/000393 filed Mar. 31, 2003, which claims priority to Australian Provisional Application No. 2002950502 filed Jul. 31, 2002. Each of the aforementioned applications is incorporated herein by reference.

FIELD OF THE INVENTION

The present invention relates to the field of instant messaging. More specifically, the present invention relates to a solution that allows for animated instant messaging.

BACKGROUND OF THE INVENTION

Instant Messaging (IM) has been growing in popularity in recent years. Commonly utilized IM formats, such as Yahoo™ Messenger, created by Yahoo™ of Sunnyvale, Calif., and .Net Messenger, created by Microsoft™ of Redmond, Wash., allow a computer user to transmit typed information or other data (such as images and videos) to other users of the IM service almost instantaneously. Additionally, many cellular phones now have text messaging services, most utilizing the Short Message Service (SMS) and Multimedia Message Service (MMS), to allow customers to send and receive text messages.

In both formats, it is common to utilize fixed simple diagrams that can be displayed within the space of one or two characters in order to quickly convey common pieces of information. Most commonly, these simple diagrams represent emotional states of the user, such as happy being indicated by a smiley-face. As such, these symbols are sometimes known as "smileys". In other circles, they are also known as "emoticons". They need not be limited to emotional states, as the simple diagram can represent any type of message, such as a "happy birthday" symbol or the like. The rigidity and lack of choice of these fixed simple diagrams, however, is a limitation.

What is needed is a solution that allows more creativity and variety in the IM environment.

BRIEF DESCRIPTION

The present invention provides a solution that allows an animated interactive talking character to appear on a user's screen when conducting an Instant Messaging (IM) session. The character which is displayed on the user's screen may be determined by a profile for the sender of the message. This allows a user to pre-select which character will be displayed on the screen of recipients of the instant messages.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
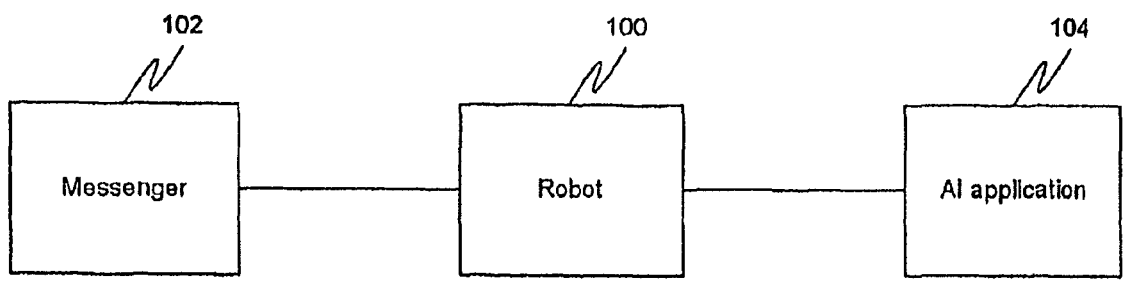
FIG. 1 is a block diagram illustrating a system utilizing a robot in accordance with an embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention provides a solution that allows an animated interactive talking character to appear on a user's screen when conducting an Instant Messaging (IM) session. The character which is displayed on the user's screen may be determined by a profile for the sender of the message. This allows a user to pre-select which character will be displayed on the screen of recipients of the instant messages.

An embodiment of the present invention is described for use with the Microsoft Messenger. As such, it is described as a plug in. One of ordinary skill in the art will recognize that the invention may be modified for use with other messaging systems.

In an embodiment of the present invention, a system is provided that allows users to select from many different animated personalities that will represent them during an IM session. Furthermore, an embodiment of the present invention allows users to import images into the animated personality, therefore permitting them to utilize characters that may, for example, have the user's face on it, or perhaps the face of the user's favourite celebrity. When the animated character is displayed on the recipient's screen, it may appear outside of the typical IM window, allowing user's to move the animated character to a convenient portion of the desktop.

In an embodiment of the present invention, text-to-speech software may be utilized to allow the animated character to read instant messages aloud. The animated characters may be programmed such that their lips may move along with the text being read. Furthermore, the typical "smileys" or "emoticons" may be interpreted by the character and the animation may change based on the corresponding emoticon. For example, if the sender of the IM message indicates an "angry" emoticon, the animated character may be displayed as pounding his first against a table.

The user may select a character to act as their personality using an interface. In an embodiment of the present invention, the interface may be a web interface, such as a web page, where the user logs in with an account name and password, such as with their IM account name and password, and selects from a number of different features. Once the user has selected a character, the selection may be transmitted to the server containing the relevant information. A user's preferences may be stored in a database that may be referenced by the IM account name and a user defined password. The database may be used to hold all relevant user information and the associated character data.

The user may download the add-in using this interface as well. The add-in may connect to the IM messaging system. It may then wait for automation events that signify that an incoming message has arrived. At this point, the add-in may contact the database to look up which personality or character the message sender has chosen. The connection to the database of stored information may be indirect, as it may be retrieved through the server where a dynamically generated query to the database may be created using the incoming request. If no record is found, a default personality may be used. The personality may then be loaded onto the user's display.

In an embodiment of the present invention, when a user changes their character, the new details may be broadcast to all members of their contact lists so that remote copies of the add-in can updated the displayed character for the user. However, in the current Microsoft functionality, there is no way for this broadcast to take place, thus in some embodiments the add-in must perform the aforementioned request for every incoming message if it wants to ensure that the character displayed is the current one. In another embodiment, the request may be performed only sporadically, loading the character data from a local cache until such time as it deems an update is necessary (perhaps once a day, for example).

The character may be used to graphically output, using animated and/or static images, a visual representation of the personality defined by the sender. Additionally, pre-recorded audio clips may be utilized along with text-to-speech synthesis in order to provide an audio version or representation of the message. The audio portion may not be limited to merely an audio transcript of the written information. It may, for example, include sound effects. Perhaps a user wishes to have a symbol indicated anger cause a sound effect of a dog growling to be played by the recipient's computer system.

The add-in may parse incoming messages for a predefined list of emoticons and may match them with a predefined list of character animations or audio clips. The add-in may then request the specified animation file from the server and play it for the user.

By maintaining the character personality based on the user's log-in name, the present invention allows the character to be a consistent identify across multiple messaging platforms, so a user may log-in on their computer at work, for example, and their character will be present in their messages just as it is from their home computer.

In an embodiment of the present invention, an auto responder function may be included to allow users to enable an automated response, such as "On vacation until May 30th" to any received messages. The add-in may automatically type and submit the user-defined message back to the sender of the incoming message. Each auto-responder message may be sent pre-appended with a specially formatted string that may be used to prevent auto-responders from responding to each other.

In an embodiment of the present invention, interactive advertising may be provided through the add-in. This advertising may be maintained in a database. it may list all advertisement details. A simple interface may be provided for administrators where they can specify the details of the advertisement. The add-in may request an advertisement from the database periodically, such as every 30 minutes.

In an embodiment of the present invention, a "robot" may be provided to allow interactive communications between a user and the server. This could be used, for example, to allow web searching through IM, access to database information (such as corporate sales records in the case where IM is used at the corporate level) or interactive help. FIG. 1 is a block diagram illustrating a system utilizing a robot in accordance with an embodiment of the present invention. The robot 100 may actually be a server application that listens for incoming messages from the messenger 102. When one of these alerts is received, it may store the message in a data structure such as an array, which is keyed against the name of the user who sent the alert. The message may then be sent to an artificial intelligence (AI) application 104 along with any previous messages from the initiating user. This allows the AI 104 to appear to be having an intelligent conversation by referring to things previously spoken about and keeping the conversation in context. Once the message has been processed and a response formed, it may be returned to the robot 100 which may forward the response via the messenger 102 to the initiating user.

The web searching function may be implemented by, for example, having the first six characters of an IM message read "google". A keyword to search may be provided after the word "google" to indicate what to search. The Robot may then take this word and forward it to the Google™ search engine, created by Google, Inc. of Mountain View, Calif. and request five results. Google may then respond with details to then be deciphered by the robot. This may then be sent back to the initiating user. The sending of the results of the search need not be immediate. It may, for example, search for 24 hours and then follow up with the results. The robot may also be used for other artificial intelligence applications. It may even be proactive, that is, initiate communication with a user before the user initiates communication.

In an embodiment of the present invention, the add-in may display a plurality of animated characters simultaneously if multiple IM sessions are being conducted. The animated characters may be placed anywhere on the display, to avoid overlap. This may also be extended to allow a "chat session" with many different animated characters representing the various senders in the chat session.

In an embodiment of the present invention, support may be provided for cellular phone or other "non-traditional" IM environments. SMS and MMS messaging may be provided as an option to subscribers. They may then provide their cellular phone information and set their auto-responder to "forward" mode to indicate that they wish their cell phone to receive their IM messages.

The add-in may then detect when a message is received and check to see if the user has set the auto-responder to forward mode. If so, then the add-in may send the message details to the server. The server may then retrieve the mobile phone number. The server may then format the message into SMS or MMS. If MMS is utilized, the server may send a thumbnail image representing the user of the incoming message and convert the message from plain text into an audio file. The message may then be forwarded to the communications gateway, which would in turn send the message into the public telephone network to be received by the user's mobile telephone.

The technology of the present invention may be modified to support other messaging services such as Yahoo, ICQ, Trillian, etc. However, there are interface issues that apply to each of these services. Generally, in order to interface with these services an Application Programming Interface (API) needs to be utilized, which exposes the features of the service to outside programmers. Thus, in that vain, some services do not provide all the needed features in their API or even simply do not provide an API at all. This problem may be overcome using several techniques. In one technique, the "handles" of all conversation windows may be stored. The add-in may then scan the contents of the conversation window every 100 ms or the like, and compare its contents with the contents of the previous scan. If the contents were different, it would indicate a new message has arrived and the difference would be parsed to extract the name of the sender and the contents of the message. These characters may then be presented to the character to visualize for the user.

In addition to a set of predefined characters from which to select, in an embodiment of the present invention the user may personalize an IM character. This allows the user to add, for example, an image of his face on the character. The personalization of the animated characters may operate in the following manner. A user interface may be provided within the application. Upon entering the "Personalization" menu area, the user may be redirected to a section of the host web site. Within this area are instructions advising a user of the processes and a means for a user to link a single image file (e.g., photograph) and upload this file to the user. The user may be provided with tools to crop the image, defining an area over the image that reduces the display area to capture only the external facial and head area. Once the upload of the user's image is complete, the user may submit the uploaded image for processing.

Once the image is submitted for processing, the images processing engine may use the area defined by the user and crop the image to that size. From this point, depending on the image processing engine deployed, the extraneous information within the image may be modified, leaving a transparent image area surrounding the facial features and head of the subject image. The image may be subsequently processed (rendered) to give the appearance of it having been "extruded", creating the appearance of a three-dimensional image. Once the rendered image is created, the engine may use predetermined parameters to manipulate the extruded image into preconfigured positions and interpolate the movement from the base position to the new position. As a result, the image processing engine may output a series of sequential, specifically sized images that depict the rendered, extruded facial images moving from the base point to the predetermined point.

Using the previously outputted images, a further stage of processing may be performed wherein the images are introduced to a three-dimensional geometry engine. The base image that contains the rendered facial features may be aligned and mapped to three-dimensional geometry representing a character. This alignment of the image occurs to that the processed image exists to cover the face of the character in three-dimensional geometry. The other character attributes may be predefined in terms of body shape, surface such as clothing and colours and textures. The geometry engine may then be used to render out a total sequence of animated motion, and output to a series of still, sequential images. These images may conform to the standard required by the next level of image processing. These images may be named and numbered following a strict nomenclature and in accordance with a suitable colour table that enables the next processing step to occur.

The sequential rendered images from the previous step may then be compiled into a single, digital file. During this process, the images are compiled in such a way as to bring together individual static images into a series of animated sequences. The animated sequences may then be compiled into a proprietary format.

The resultant compilation may deliver several files that describe its contents and deliver connectivity to the user application. The completed files may be deposited on the server. The server may be notified of the newly created character and include the image within the character library, assigning the image to the identity of the initial image provider. The user may then be notified by email of their completed character.

Additionally, in certain circumstances it may be desirable to define animations to an "idle" state. It has been discovered that if characters appear on screen without moving for long periods of time, it becomes disconcerting to users. At the same time, small character movements at frequent/random intervals help to enhance the realism of a given characters. As a result, when creating a character, a specific animation may be assigned to an idle "state". There may be, for example, 3 levels of idle, levels 1, 2, and 3. The first level may idle a randomly selected movement and play it on the screen. This may occur when the character has not bee used for a short period of time. If no interaction with the character continues, the agent application may begin to play animations with an assigned state of idle level 2 animations. Similarly, when the time interval of interaction with the user increases, idle 3 assigned animations may be displayed to the user, and so on.

In an embodiment of the present invention, the add-in may automatically download an idle animation and display it on the screen when a user has not interacted with the animated character for a predetermined period of time. It may similarly download a next level of idle if there continues to be no interaction.

Commonly, instant messages include acronyms for typically-used phrases, such as LTR for later, and A/S/L for Age/Sex/Location. A table may be utilized to store these acronyms and their corresponding definitions. When the add-in detects such an acronym, it may substitute the definition when delivering it to the user (via the screen or the text-to-speech synthesis).

In addition to the text-to-speech functionality described above, the present invention may also include the opposite, speech-to-text synthesis. Through such features, the add-in may receive voice commands from a user through a microphone and convert the speech to text in the instant message. Certain phrases may then be used for special commands, such as sending the instant message.

Figure 2:
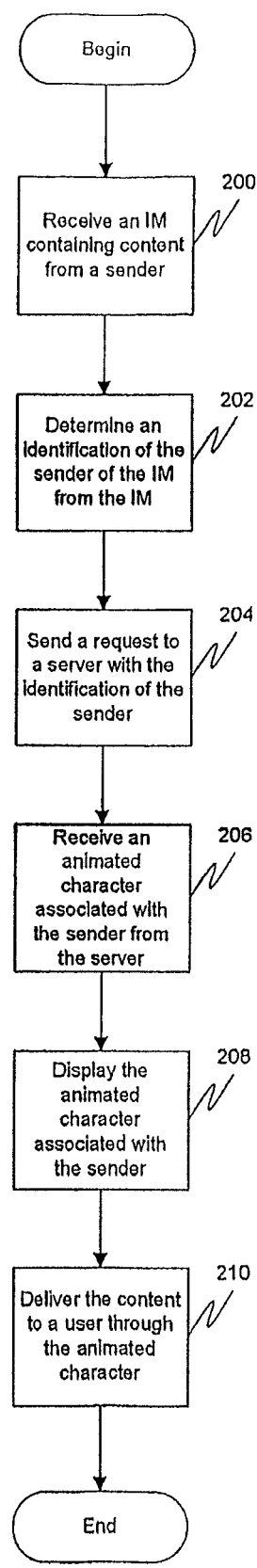
FIG. 2 is a flow diagram illustrating a method for instant messaging on a computer system in accordance with an embodiment of the present invention.

FIG. 2 is a flow diagram illustrating a method for instant messaging on a computer system in accordance with an embodiment of the present invention. At 200, an IM may be received containing content from the sender. At 202, an identification of the sender of the IM may be determined from the IM. At 204, a request may be sent to a server with the identification of the sender. At 206, an animated character associated with the sender may be received from the server. At 208, an animated character associated with the sender may be displayed. This displaying may include displaying the animated character outside of an IM window, and allowing a user to move the animated character anywhere on the screen. At 210, the content may be delivered to a user through the animated character. This may include converting text from the IM into audio through text-to-speech synthesis and playing the audio. The delivering may further include animating the character in synchronization with the playing of the audio. Further, the delivering may include detecting an emoticon in the IM and animating the character in a way that reflects the emoticon.

Figure 3:
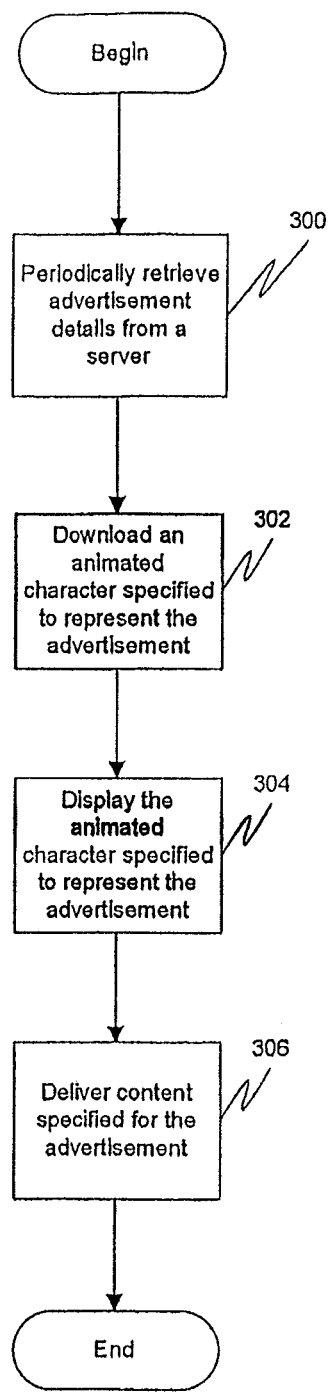
FIG. 3 is a flow diagram illustrating a method for receiving advertising on a computer system in accordance with an embodiment of the present invention.

FIG. 3 is a flow diagram illustrating a method for receiving advertising on a computer system in accordance with an embodiment of the present invention. At 300, advertisement details may be periodically retrieved from a server. At 302, an animated character specified to represent the advertisement may be downloaded. At 304, the animated character specified to represent the advertisement may be displayed. At 306, content specified for the advertisement may be delivered.

Figure 4:
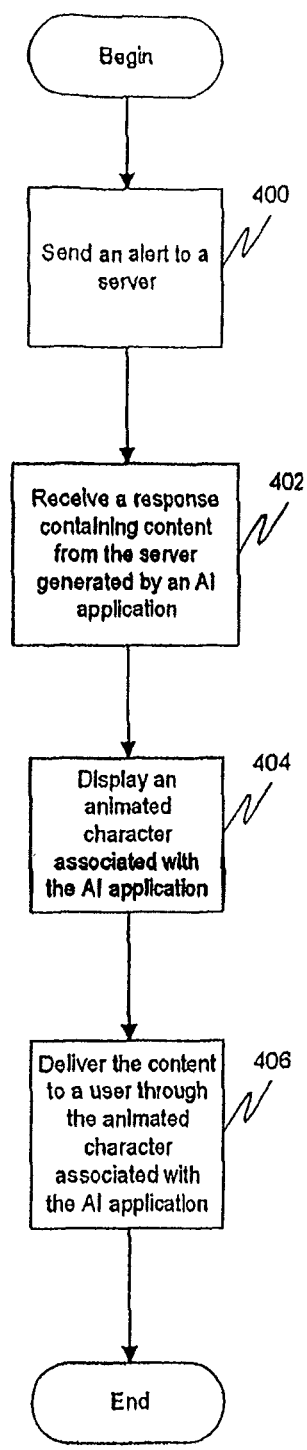
FIG. 4 is a flow diagram illustrating a method for interacting with a software robot in accordance with an embodiment of the present invention.

FIG. 4 is a flow diagram illustrating a method for interacting with a software robot in accordance with an embodiment of the present invention. At 400, an alert may be sent to a server. The sending of an alert may include a sending a message indicating that a web search is to be performed and sending keywords to search in the web search. At 402, a response containing content may be received from the server generated by an artificial intelligence (AI) application. At 404, an animated character associated with the AI application may be displayed. At 406, the content may be delivered to a user through the animated character associated with the AI application. This may include delivering results of a web search if one was conducted.

Figure 5:
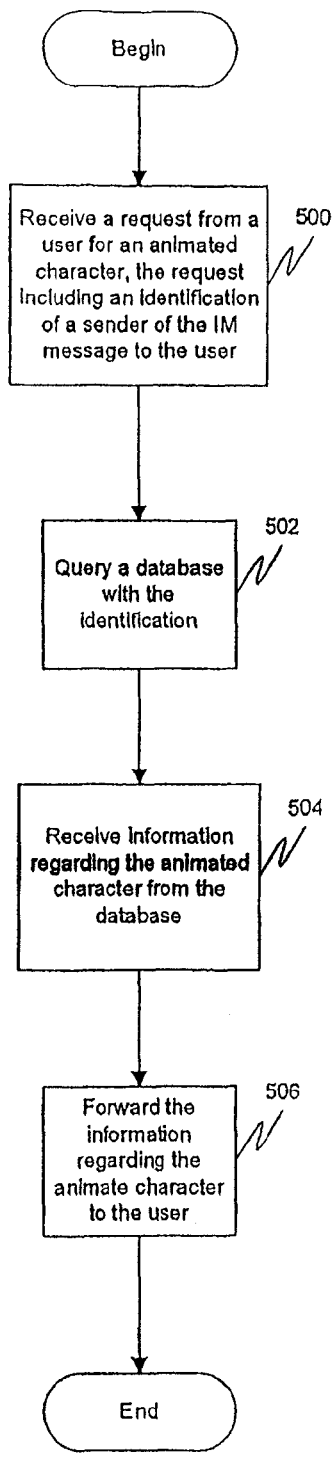
FIG. 5 is a flow diagram illustrating a method for managing an IM system in accordance with an embodiment of the present invention.

FIG. 5 is a flow diagram illustrating a method for managing an IM system in accordance with an embodiment of the present invention. At 500, a request may be received from a user for an animated character, the request including an identification of a sender of the IM message to the user. At 502, a database may be queried with the identification. At 504, information regarding the animated character may be received from the database. This information may include a location for an animation file representing the animated character. At 506, the information regarding the animated character may be forwarded to the user.

Figure 6:
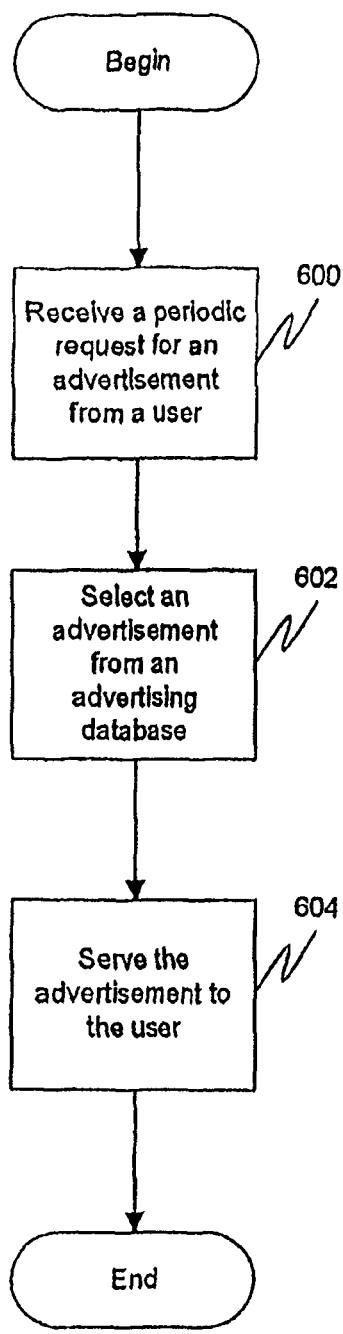
FIG. 6 is a flow diagram illustrating a method for serving advertising to a user of a computer system in accordance with an embodiment of the present invention.

FIG. 6 is a flow diagram illustrating a method for serving advertising to a user of a computer system in accordance with an embodiment of the present invention. At 600, a periodic request for an advertisement may be received from a user. At 602, an advertisement may be selected from an advertising database. At 604, the advertisement may be served to the user.

Figure 7:
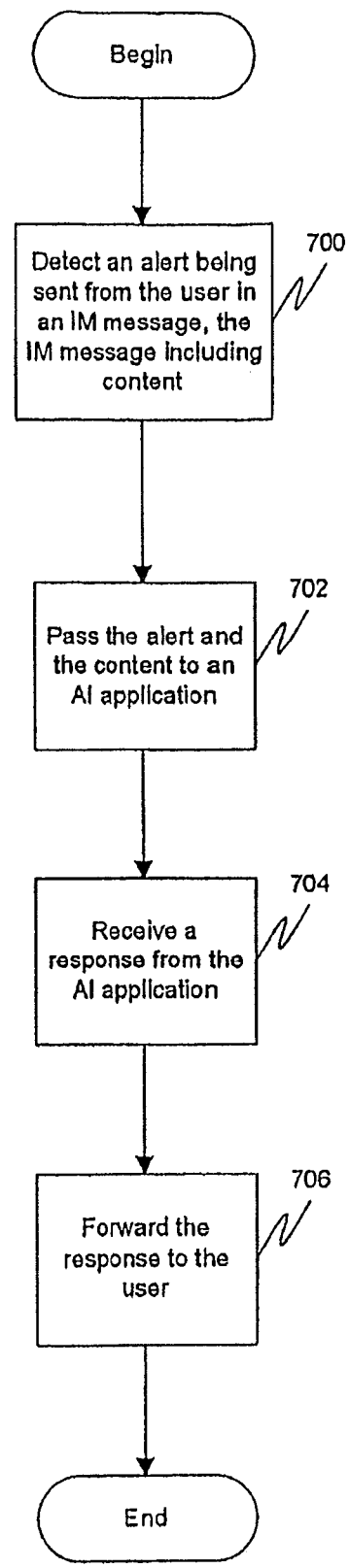
FIG. 7 is a flow diagram illustrating a method for providing access to an artificial intelligence software robot to a user in accordance with an embodiment of the present invention.

FIG. 7 is a flow diagram illustrating a method for providing access to an artificial intelligence software robot to a user in accordance with an embodiment of the present invention. At 700, an alert being sent from the user in an IM message may be detected, the IM message including content. At 702, the alert and the content may be passed to an artificial intelligence application. The AI application may provide interactive help, web searching, or other capabilities to the user. At 704, a response from the artificial intelligence application may be received. At 706, the response may be forwarded to the user.

Figure 8:
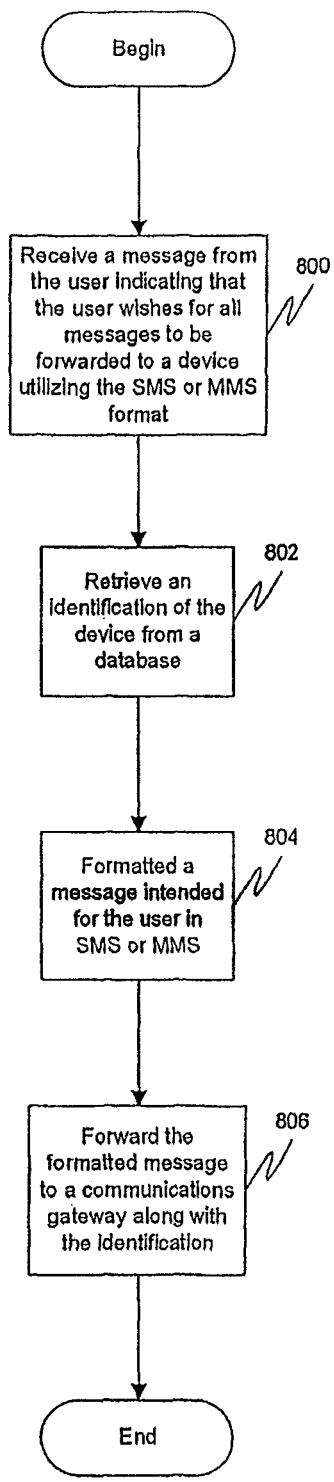
FIG. 8 is a flow diagram illustrating a method for providing IM access on a Short Message Service (SMS) or Multimedia Message Service (MMS) format device in accordance with an embodiment of the present invention.

FIG. 8 is a flow diagram illustrating a method for providing IM access on a Short Message Service (SMS) or Multimedia Message Service (MMS) format device in accordance with an embodiment of the present invention. At 800, a message may be received from the user indicating that the user wishes for all messages to be forwarded to a device utilizing the SMS format. At 802, an identification of the device may be retrieved from a database. This identification may be a cellular phone number. At 804, a message intended for the user may be formatted in SMS. At 806, the formatted message may be forwarded to a communications gateway along with the identification.

Figure 9:
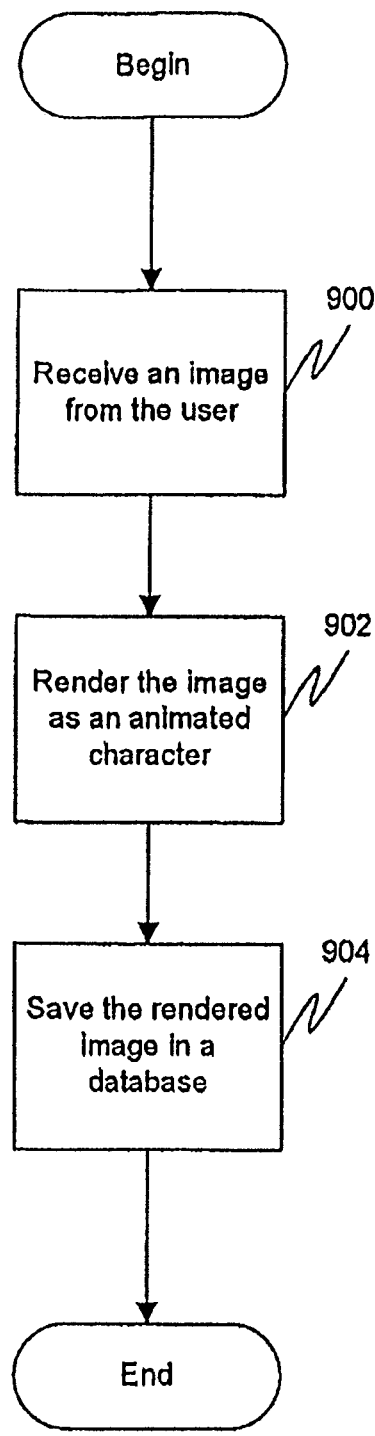
FIG. 9 is a flow diagram illustrating a method for personalizing an animated character on a computer system in accordance with an embodiment of the present invention.

FIG. 9 is a flow diagram illustrating a method for personalizing an animated character on a computer system in accordance with an embodiment of the present invention. At 900, an image may be received from the user. At 902, the image may be rendered as an animated character. This may include removing extraneous information from the image, modifying the image to a three-dimensional image, manipulating the image into preconfigured positions, interpolating movements from a base position to a new position for each of one or more animations for the animated character to perform, and introducing the image to a three-dimensional geometry engine. At 904, the rendered image may be saved in a database.

Figure 10:
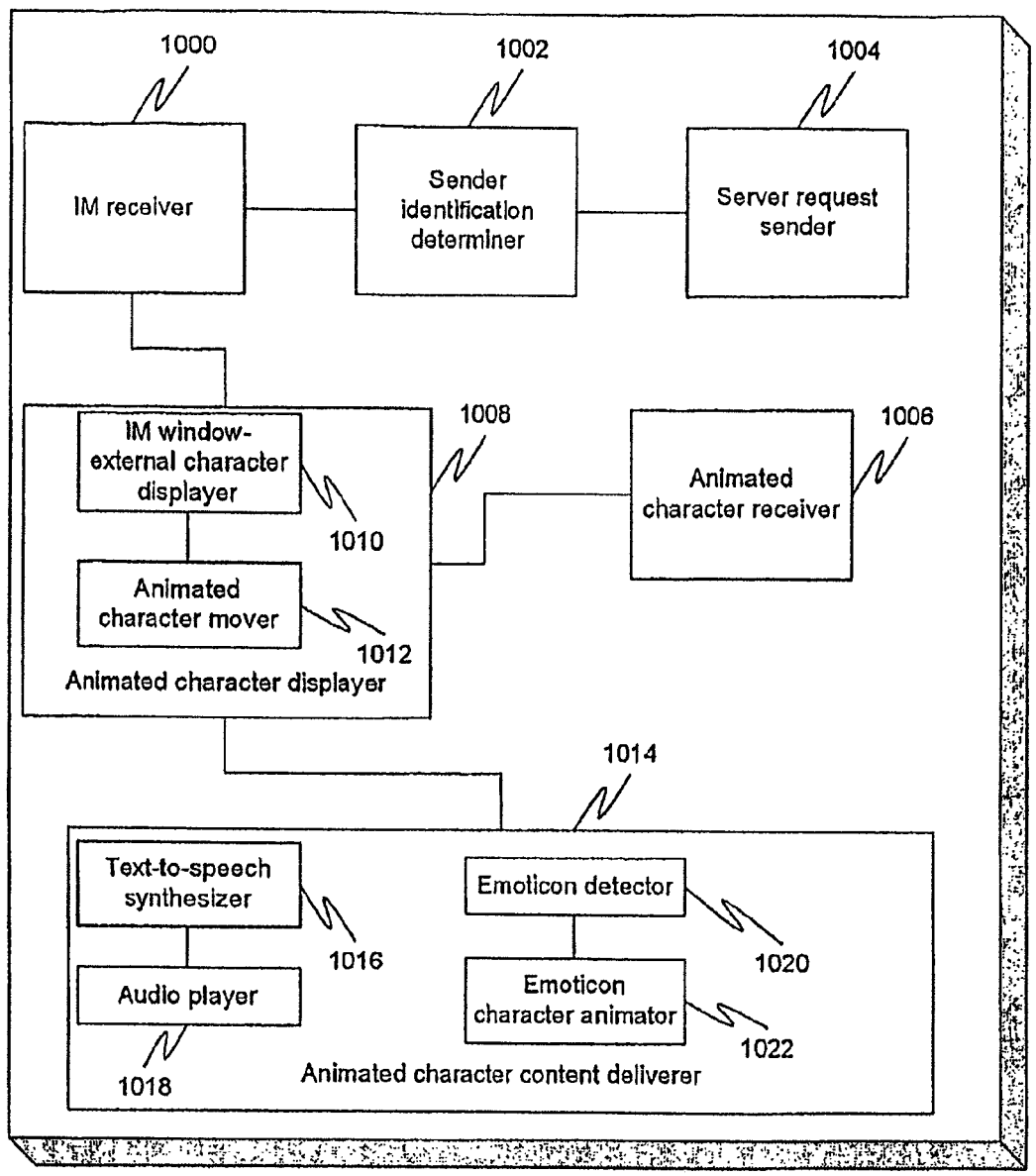
FIG. 10 is a block diagram illustrating an apparatus for instant messaging on a computer system in accordance with an embodiment of the present invention.

FIG. 10 is a block diagram illustrating an apparatus for instant messaging on a computer system in accordance with an embodiment of the present invention. An IM receiver 1000 may receive an IM containing content from the sender. A sender identification determiner 1002 coupled to the IM receiver 1000 may determine an identification of the sender of the IM from the IM. A server request sender 1004 coupled to the sender identification determiner 1002 may send a request to a server with the identification of the sender. An animated character receiver 1006 may receive an animated character associated with the sender from the server. An animated character displayer 1008 coupled to the animated character receiver 1006 and to the IM receiver 1000 may display an animated character associated with the sender. This displaying may include displaying the animated character outside of an IM window using an IM window-external character displayer 1010, and allowing a user to move the animated character anywhere on the screen using an animated character mover 1012. An animated character content deliverer 1014 coupled to the animated character displayer 1008 may deliver the content to a user through the animated character. This may include converting text from the IM into audio through text-to-speech synthesis with a text-to-speech synthesizer 1016 and playing the audio with an audio player 1018 coupled to the text-to-speech synthesizer 1016. The delivering may further include animating the character in synchronization with the playing of the audio using an animated character audio synchronizer 1020. Further, the delivering may include detecting an emoticon in the IM using an emoticon detector 1022 and animating the character in a way that reflects the emoticon using an emoticon character animator 1024 coupled to the emoticon detector 1022.

Figure 11:
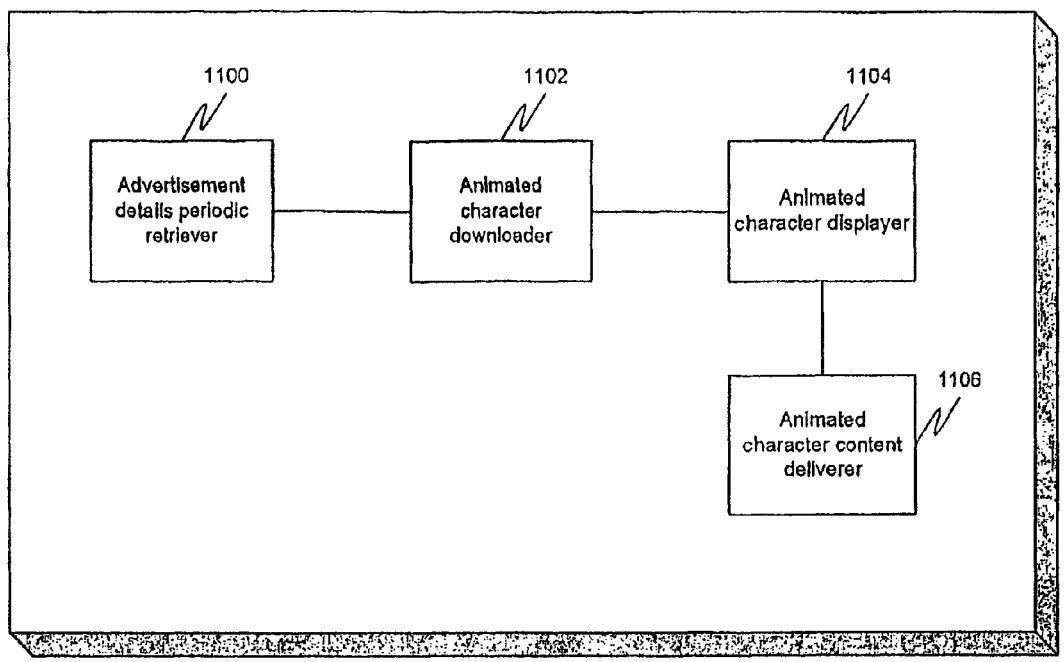
FIG. 11 is a block diagram illustrating an apparatus for receiving advertising on a computer system in accordance with an embodiment of the present invention.

FIG. 11 is a block diagram illustrating an apparatus for receiving advertising on a computer system in accordance with an embodiment of the present invention. An advertisement details periodic retriever 1100 may periodically retrieve advertisement details from a server. An animated character downloader 1102 coupled to said advertisement details periodic retriever 1100 may download an animated character specified to represent the advertisement. An animated character displayer 1104 coupled to the animated character downloader 1102 may display the animated character specified to represent the advertisement. An animated character content deliverer 1106 coupled to the animated character displayer 1104 may deliver content specified in the dynamically created file.

Figure 12:
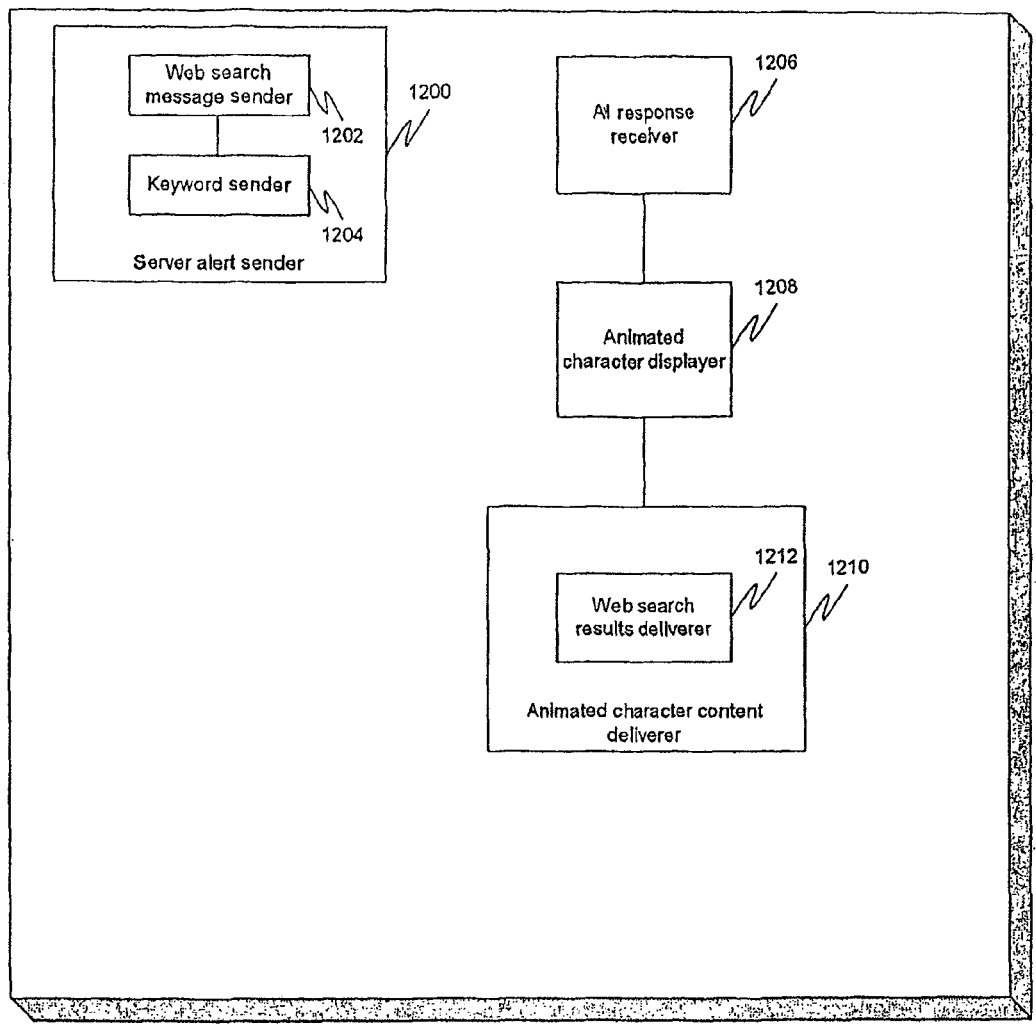
FIG. 12 is a block diagram illustrating an apparatus for interacting with a software robot in accordance with an embodiment of the present invention.

FIG. 12 is a block diagram illustrating an apparatus for interacting with a software robot in accordance with an embodiment of the present invention. A server alert sender 1200 may send an alert to a server. The sending of an alert may include a sending a message indicating that a web search is to be performed using a web search message sender 1202 and sending keywords to search in the web search using a keyword sender 1204 coupled to the web search message sender. An artificial intelligence response receiver 1206 may receive a response containing content from the server generated by an artificial intelligence (AI) application. An animated character displayer 1208 coupled to the artificial intelligence response receiver 1206 may display an animated character associated with the AI application. An animated character content deliverer 1210 coupled to the animated character displayer 1208 may deliver the content to a user through the animated character associated with the AI application. This may include delivering results of a web search if one was conducted using a web search results deliverer 1212.

Figure 13:
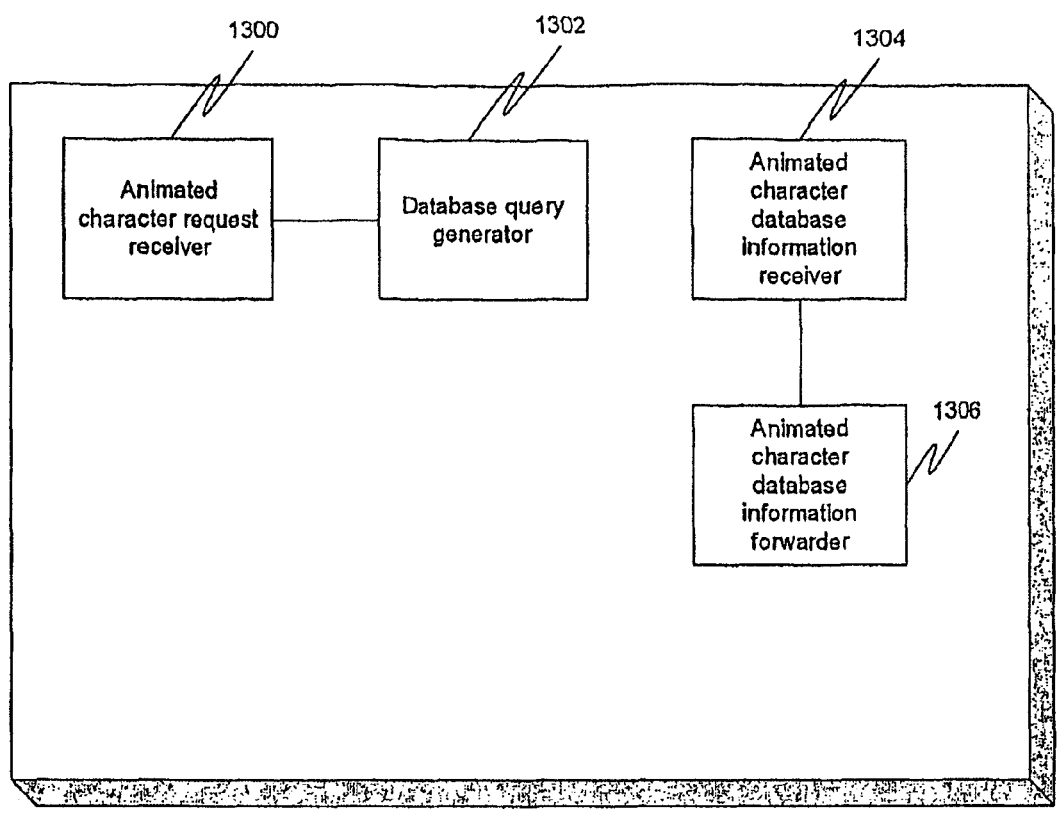
FIG. 13 is a block diagram illustrating an apparatus for managing an IM system in accordance with an embodiment of the present invention.

FIG. 13 is a block diagram illustrating an apparatus for managing an IM system in accordance with an embodiment of the present invention. An animated character request receiver 1300 may receive a request from a user for an animated character, the request including an identification of a sender of the IM message to the user. A database query generator 1302 coupled to the animated character request receiver 1300 may query a database with the identification. An animated character database information receiver 1304 may receive information regarding the animated character from the database. This information may include a location for an animation file representing the animated character. An animated character database information forwarder 1306 coupled to the animated character database information receiver 1304 may forward the information regarding the animated character to the user.

Figure 14:
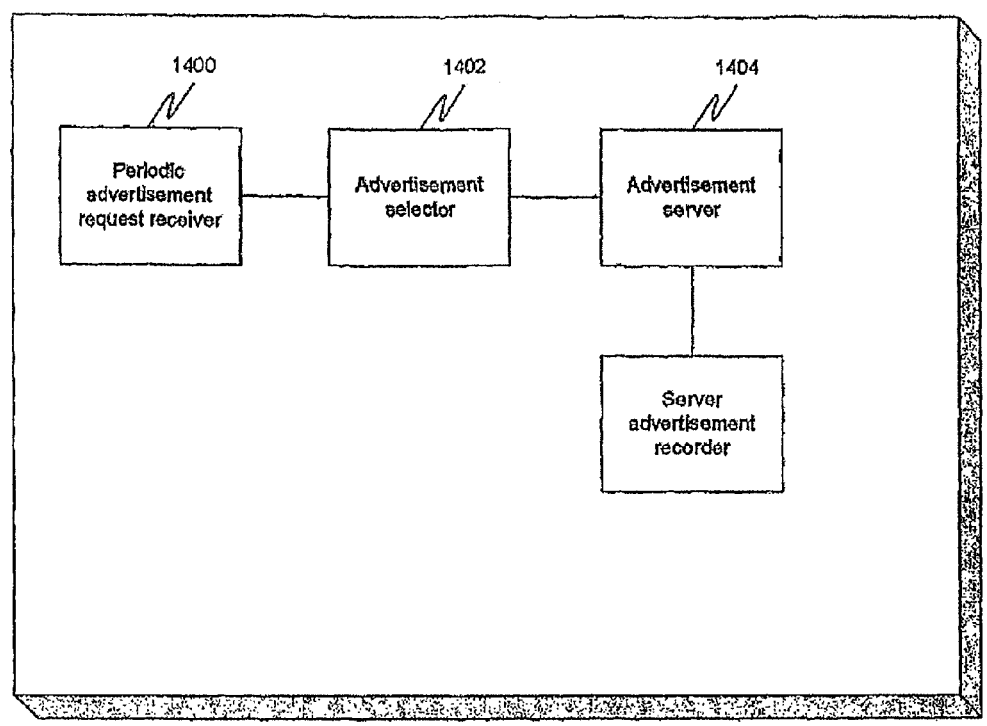
FIG. 14 is a block diagram illustrating an apparatus for serving advertising to a user of a computer system in accordance with an embodiment of the present invention.

FIG. 14 is a block diagram illustrating an apparatus for serving advertising to a user of a computer system in accordance with an embodiment of the present invention. A periodic advertisement request receiver 1400 may receive a periodic request for an advertisement from a user. An advertisement selector 1402 coupled to the periodic advertisement request receiver 1400 may select an advertisement from an advertising database. An advertisement server 1404 coupled to the advertisement selector 1402 may serve the advertisement to the user.

Figure 15:
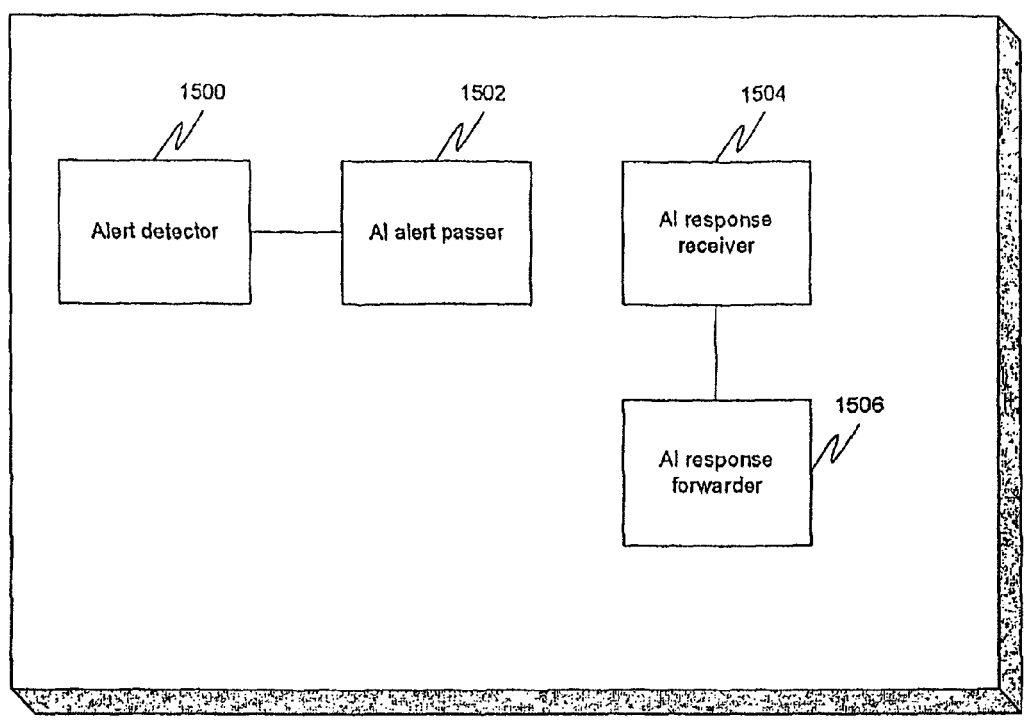
FIG. 15 is a block diagram illustrating an apparatus for providing access to an artificial intelligence software robot to a user in accordance with an embodiment of the present invention.

FIG. 15 is a block diagram illustrating an apparatus for providing access to an artificial intelligence software robot to a user in accordance with an embodiment of the present invention. An alert detector 1500 may detect an alert being sent from the user in an IM message, the IM message including content. An artificial intelligence alert passer 1502 coupled to the alert detector 1500 may pass the alert and the content to an artificial intelligence application. The AI application may provide interactive help, web searching, or other capabilities to the user. An artificial intelligence response receiver 1504 may receive a response from the artificial intelligence application. An artificial intelligence response forwarder 1506 coupled to the artificial intelligence response receiver 1504 may forward the response to the user.

Figure 16:
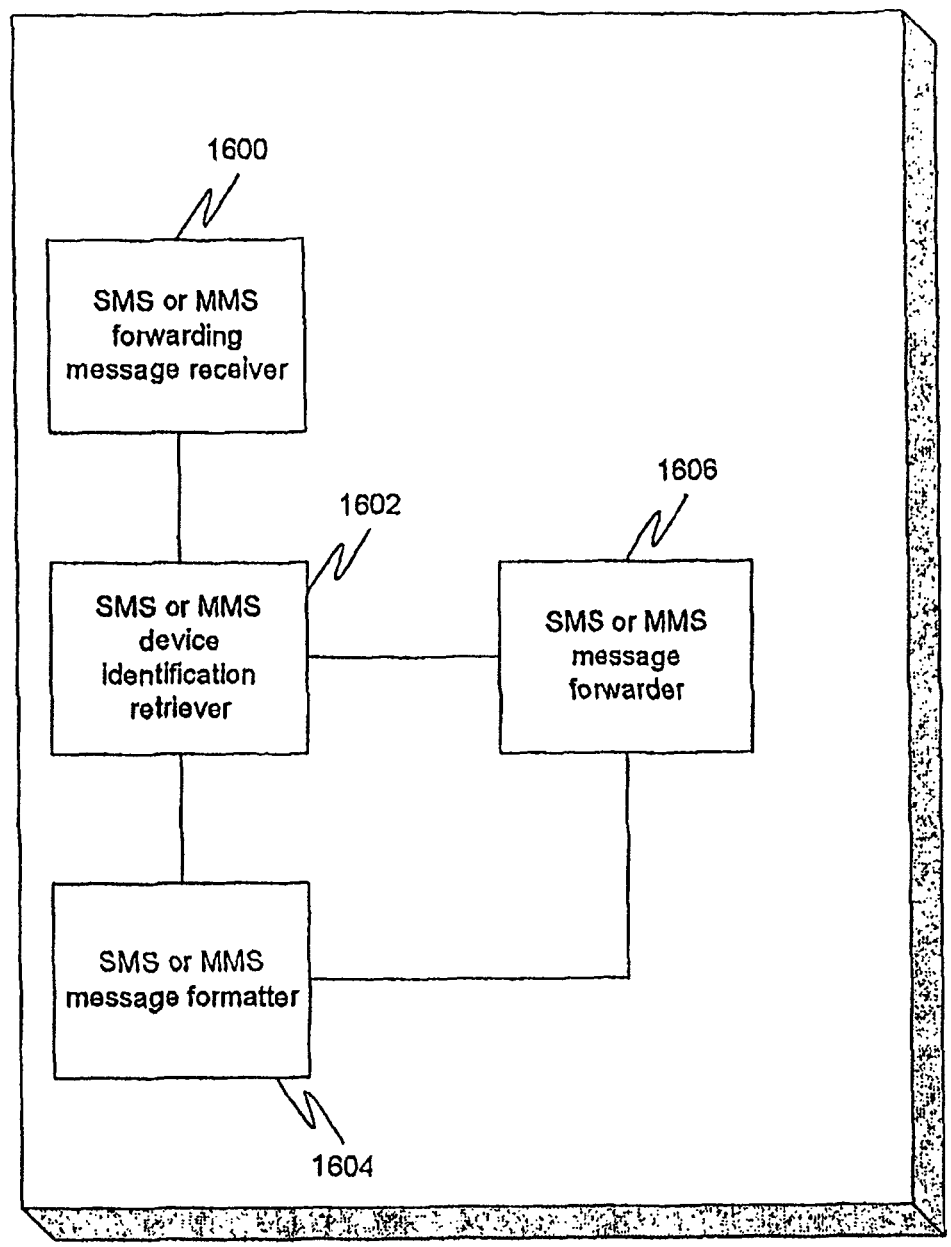
FIG. 16 is a block diagram illustrating an apparatus for providing IM access on a Short Message Service (SMS) or Multimedia Message Service (MMS) format device in accordance with an embodiment of the present invention.

FIG. 16 is a block diagram illustrating an apparatus for providing IM access on a Short Message Service (SMS) or Multimedia Message Service (MMS) format device in accordance with an embodiment of the present invention. An SMS or MMS forwarding message receiver 1600 may receive a message from the user indicating that the user wishes for all messages to be forwarded to a device utilizing the SMS format. An SMS or MMS device identification retriever 1602 coupled to the SMS or MMS forwarding message receiver 1600 may retrieve an identification of the device from a database. This identification may be a cellular phone number. An SMS or MMS message formatter 1604 may format a message intended for the user in SMS or MMS. An SMS or MMS message forwarder 1606 coupled to the SMS or MMS message formatter 1604 and to the SMS or MMS device identification retriever 1602 may forward the formatted message to a communications gateway along with the identification.

Figure 17:
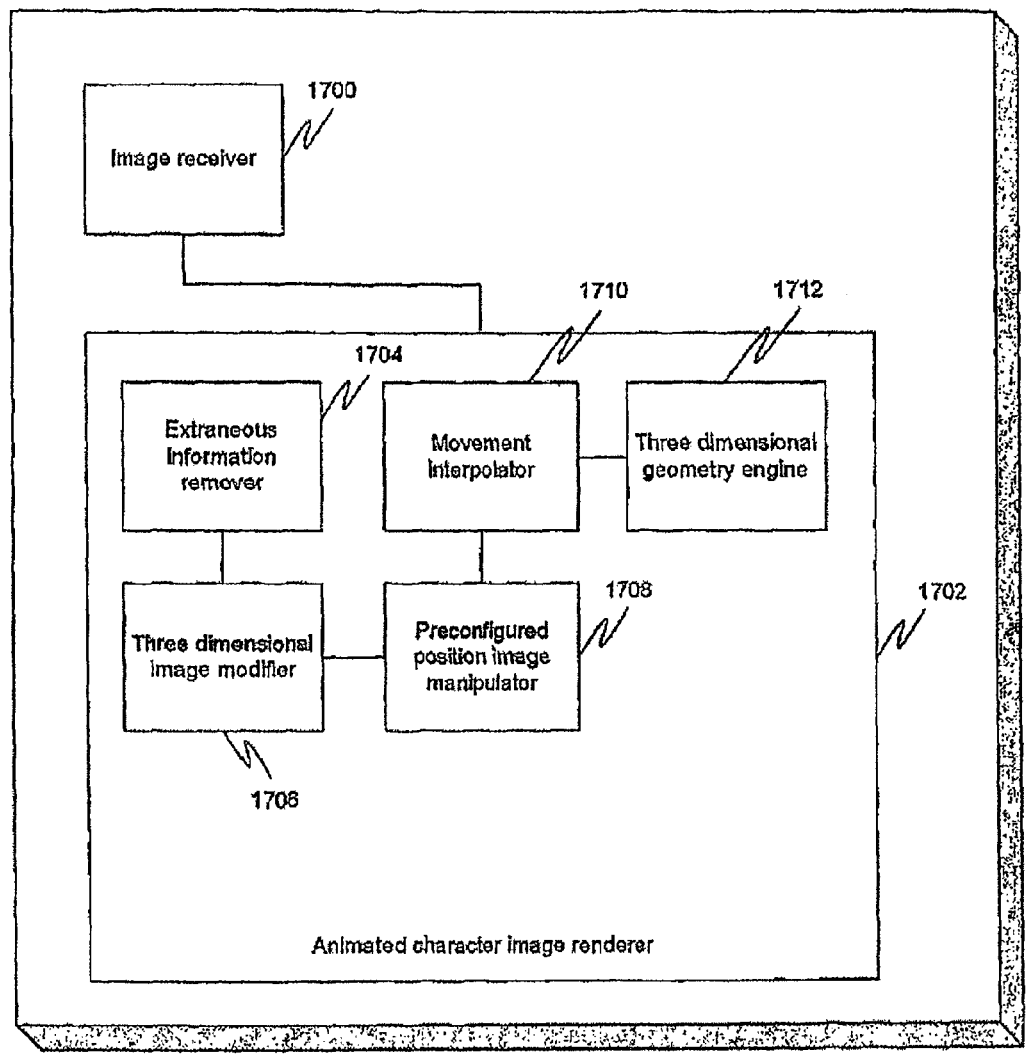
FIG. 17 is a block diagram illustrating an apparatus for personalizing an animated character on a computer system in accordance with an embodiment of the present invention. An image receiver 1700 may receive an image from the user.

FIG. 17 is a block diagram illustrating an apparatus for personalizing an animated character on a computer system in accordance with an embodiment of the present invention. An image receiver 1700 may receive an image from the user. An animated character image renderer 1702 coupled to the image receiver 1700 may render the image as an animated character. This may include removing extraneous information from the image using an extraneous information remover 1704, modifying the image to a three-dimensional image using a three-dimensional image modifier 1706 coupled to the extraneous information remover 1704, manipulating the image into pre-configured positions using a preconfigured position image manipulator 1708 coupled to the three-dimensional image modifier 1706, interpolating movements from a base position to a new position for each of one or more animations for the animated character to perform using a movement interpolator 1710 coupled to the preconfigured position image manipulator 1708, and introducing the image to a three-dimensional geometry engine 1712 coupled to the movement interpolator 1710. The rendered image may then be saved in a database.

Figure 18:
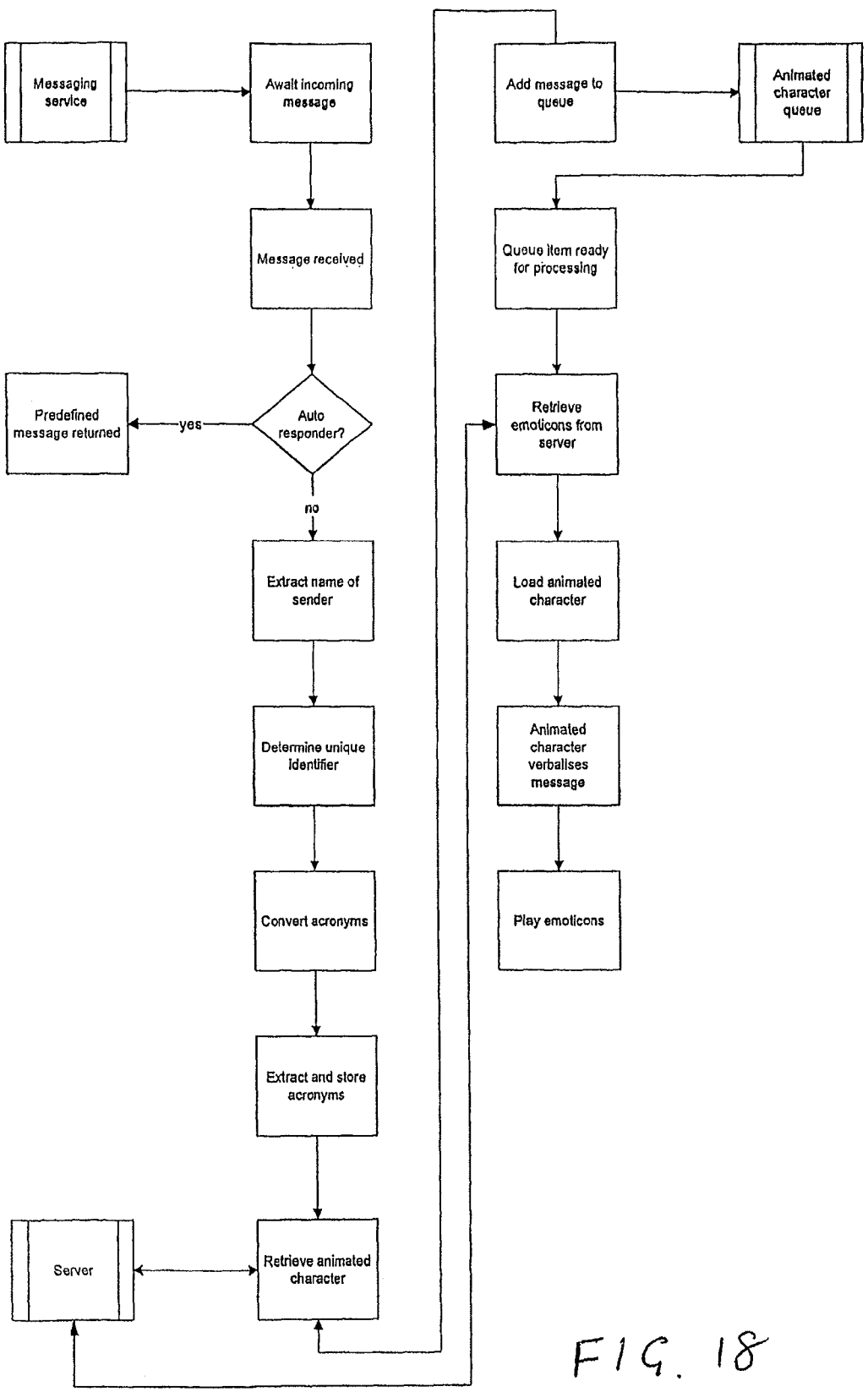
FIG. 18 is a block diagram illustrating a method and an apparatus for providing IM access on a Short Message Service (SMS) or Multimedia Message Service (MMS) format device in accordance with an embodiment of the present invention which makes use of a dynamic array to form an instruction queue.

FIG. 18 is a block diagram illustrating a method and an apparatus for providing IM access on a Short Message Service (SMS) or Multimedia Message Service (MMS) format device in accordance with an embodiment of the present invention which makes use of a dynamic array to form an instruction queue. The biggest problem was in displaying the animated characters for each user. Initial version of the invention saw just a single animated character on the desktop, which would act primarily as a friendly interface for the user. One of its functions was to read out the text of incoming instant messages and prefix the audio output with the name of the sender. However, generally relevant software is programmed asynchronously. This means that a user program would tell the animated character what it needed to do and then continue with its own processing. Then at some undetermined time the program would initiate and make the animated character perform whatever you had requested. Once this is completed the software then notifies the user program that it has finished and the user program can do whatever with this information it chooses. Due to this it is not possible to harbour more than an animated character at a time, and the reading out of the incoming messages might not take place in their designated order. In addition to this some computer systems can only support audio output from one user program at a time. If two animated characters needed to speak at once then only one of the characters output would be heard and the other would be blocked.

Now because of the notification process mentioned above whereby program notifies the user program that a request has been processed we were able to build a 'sliding window' or a dynamic array which is simply a code version of a queue. So what would happen is the user program would receive an incoming message and it would be added into this queue, rather than immediately requesting an animated character. If this request is the first or only item in the queue it would be automatically 'popped' off and requests an animated character. Once request had been performed it would notify the user program and the user program would (if the queue is not empty) pop off another request and repeat the cycle over again. By doing this we overcame both of the problems whereby not only can we control the order in which incoming messages are displayed to the user, but also prevent the animated characters from talking over one and another.

The process therefore as shown in FIG. 18 is:
1. The invention awaits an incoming message for the instant messaging program.
2. Once it has been determined that an incoming message was received the invention would perform the following:—
   a. Check to see if the auto-responder is turned on
      i. If it is then a predefined message would be returned to the sender of the incoming message
   b. Extract the name of the sender
   c. Determine the unique identifier of this sender by checking in the contacts list
   d. Convert any acronyms into 'English'
   e. Check for any emoticons and store them in a list for later.
3. Request the details regarding the senders animated character from the server
4. Add the message text into the queue (as mentioned above) along with any emoticons that were extracted
5. Once these items in the queue get processed the invention will retrieve the emoticons for the defined animated character from the server
6. Load the users animated character onto the screen
7. Read out the message while the above step 5 is taking place
8. Play the emoticons The second biggest problem to be overcome was how to determine an incoming message had arrived. The solution we decided upon was to have the invention locate the messaging windows and scan their contents at a regular interval (say 100 ms). It would then compare the contents of the messaging window with the contents of the window previously. It was determined that if the contents were different then a new message had arrived and that the different between the two would represent this message. It was then into a process of extracting the name of the sender from this message and adding its details to the queue for processing.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for instant messaging on a recipient's computer system, including:
   on the recipient's computer system, receiving an instant message (IM) containing content from a sender, said IM addressed to the recipient by the sender;
   on the recipient's computer system, determining an identification of said sender of said IM from said IM;
   on the recipient's computer system determining if an animated character associated with said sender is stored on the recipient's computer system and if not,
   sending a request from the recipient's computer system for an animated character associated with said sender to a character server with said identification of said sender, said Character server having records of animated characters and senders, each sender associated with a specific animated character;
   receiving, in response to said request, in the recipient's computer system from said character server the animated character associated with said sender;

displaying said animated character associated with said sender at a location on the recipient's computer system, the location selected by the recipient or the recipient's computer system; and delivering said content on the recipient's computer system through said animated character;

wherein said IM is received at said recipient's computer system without being relayed by said character server, and wherein said instant message when sent by the sender does not include said animated character associated with said sender and when received by the recipient and was addressed to the recipient by the sender.

2. The method of claim 1 further including: periodically retrieving advertisement details from a server;

downloading to the recipient's computer system an animated advertising character specified to represent said advertisement;

displaying on the recipient's computer system said animated advertising character specified to represent said advertisement; and receiving content specified for said advertisement on the recipient's computer system through said animated advertising character.

3. The method of claim 1, further including: sending an alert to a server;

receiving in the recipient's computer system a response containing content from said server generated by an artificial intelligence (AI) application;

displaying on the recipient's computer system an animated character associated with said AI application; and receiving said content on the recipient's computer system through said animated character associated with said AI application.

4. The method of claim 3, wherein said sending an alert includes:

sending a message indicating that a web search is to be performed; and sending keywords to search in said web search.

5. The method of claim 4, wherein said receiving said content comprises receiving results of said web search.

6. The method of claim 1, further including:

associating a sender with a plurality of predefined animated characters; and allowing the sender to select an animated character from the plurality of predefined animated characters associated with the sender to be displayed on the recipient's computer system in the event the sender sends an IM message to said recipient's computer system.

7. The method of claim 1, further including:

initially allowing the sender to upload an image for use in creating a record of an animated character to be displayed on the recipient's computer system when said sender sends an tM message to said recipient's computer system.

8. The method of claim 1 wherein delivering said content to the recipient's computer system includes:

converting text from said IM into audio through text-to-speech synthesis; and playing said audio.

9. The method of claim 8, wherein delivering said content to the recipient's computer system further includes:

animating said character in synchronization with said playing of said audio.

10. The method of claim 9, wherein delivering said content to the recipient's computer system further includes:

detecting an emoticon in said IM; and animating said character in a way that reflects an emotion of said emoticon.

11. The method of claim 1, wherein displaying said animated character includes displaying said animated character outside of an IM window on a screen.

12. The method of claim 11, further including enabling said recipient to move said animated character anywhere on the screen.

13. A method for instant messaging on a recipient's digital communication system, including:

receiving on the recipient's digital communication system one or more instant messages (IM) containing content sent from at least one sender to said recipient, each at least one sender associated with a specific animated character;

the or each instant message not including said specific animated character associated with the respective sender when sent by the sender and when received by the recipient;

forming a queue by creating a dynamic array and inserting one or more of said instant messages into said queue;

determining ma identification of said at least one sender of one of said IMs from said IM;

determining if an, animated character associated with said sender is stored on the recipient's digital communication system and if not, sending a request to a character server with said identification of said server;

receiving from said character server, in response to said request, an animated character associated with said sender;

controlling the timing of operations of actions in the queue and when required displaying at least one animated character associated with a respective sender; and delivering said content on the recipient's computer system by means of said at least one animated character displayed at a location on a display of the recipient's computer system, tile location selected by the recipient or the recipient's computer system;

wherein said IMs are received at said recipient's computer system without being relayed by said character server, and wherein, when multiple instant messages are received, the contents of said instant messages are delivered sequentially to the recipient mid not overlapping in time.

14. An apparatus for instant messaging on a computer system, including:

an IM receiver for receiving at least one Instant Message (IM) from at least one sender, said at least one IM addressed to the recipient by the sender;

a sender identification determiner coupled to said IM receiver, for determining the identity of the sender of a received IM;

a checker for determining if an animated character associated with said sender is stored on the recipient's digital communication system and if not, a server request sender responsive to said sender identification determiner for forwarding the identity of a sender of an IM to a character server, said character server having records of animated characters and senders, each sender associated with a specific animated character;

an animated character receiver for receiving an animated character associated with the respective sender from said character server, and an animated character displayer coupled to said IM receiver and said animated character receiver;

and an animated character content deliverer coupled to said animated character displayer, wherein said IM receiver without being relayed by said character server, and wherein said instant message when sent by the sender and when received by the recipient did not include said animated character associated with said sender.

15. The apparatus of claim 14, further including:
an advertisement details periodic retriever; and
an animated character downloader coupled to said advertisement details periodic retriever and to said animated character content deliverer.

16. The apparatus of claim 14, further including:
a server alert sender;
an artificial intelligence response receiver coupled to said animated character displayer and to said animated character content deliverer.

17. The apparatus of claim 16, wherein said server alert sender includes:
a web search message sender; and
a keyword sender coupled to said web search message sender.

18. An apparatus for instant messaging on a computer system, including:
in a recipient's computer system, means for receiving an instant message (IM) containing content from a sender addressed to the recipient by the sender;
in the recipient's computer system, means for determining an identification of said sender of said IM from said IM;
in the recipient's computer system, means for determining if an animated character associated with said sender is stored on the recipient's digital communication system and if not,
in the recipient's computer system, means for sending a request from the recipient's computer system for an animated character associated with said sender to a character server with said identification of said sender, said character server having records of animated characters and senders, each sender associated with a specific animated character;
in the recipient's computer system, means for receiving, it~response to said request, from said character server said animated character associated only with said sender;
in the recipient's computer system, means for displaying said animated character associated with said sender; and
means for delivering said content to the recipient's computer system through said animated character,
wherein said IM is received at said recipient's computer system without being relayed by said character server, and
wherein said instant message when sent by the sender and when received by the recipient did not include said animated Character associated with said sender.

19. The apparatus of claim 18, further including: means for allowing the sender to select from one or more predefined animated characters to be displayed on the recipient's computer system when said sender sends an IM message to said recipient's computer system.

20. The apparatus of claim 18, further including:
means for allowing the sender to upload an image to be used in creating an animated character to be displayed on the recipient's computer system when said sender sends an IM message to said recipient's computer system.

21. The apparatus of claim 18, wherein said means for delivering includes:
means for converting text from said IM into audio through text-to-speech synthesis; and
means for playing said audio.

22. The apparatus of claim 21, wherein said means for delivering further includes:
means for animating said character in synchronization with said playing of said audio.

23. The apparatus of claim 21, wherein said means for delivering farther includes:
means for detecting an emoticon in said IM; and
means for animating said character in a way that reflects an emotion of said emoticon.

24. The apparatus of claim 18, wherein said means for displaying includes means for displaying said animated character outside of an IM window on a screen.

25. The apparatus of claim 24, further including means for enabling said recipient to move said animated character anywhere on the screen.

26. A program storage device readable by a machine, tangibly embodying a program of instructions executable by the machine to perform a method for instant messaging on a computer system, the method including:
receiving on the machine ma instant message (IM) containing content from a sender, wherein said IM was addressed to a recipient by the sender;
determining an identification of said sender of said [M from said IM;
determining if an animated character associated with said sender is stored on the recipient's digital communication system and if not,
sending a request from the machine to a character server with said identification of said sender, said character server having records of animated characters and senders, each sender associated with a specific animated character;
receiving on the machine from said character server an animated character associated with said sender
displaying at a location on the machine an animated character associated with said sender, the location selected by the recipient or the program; and
delivering said content on the machine through said animated character;
wherein said IM is received at said machine without being relayed by said character server, and
wherein said instant message when sent by the sender and when received by the recipient did not include said animated character associated with said sender.

27. A method of instant messaging, including the steps of:
associating an animated character located on a character server with a first user;
the first user creating an instant message containing content, said instant message not including said animated character associated with said sender;
said first user sending said instant message to a an address of a recipient known to the first user;
on the recipient's computer system, receiving said instant message;
on the recipient's computer system, determining an identification of said first user of said instant message from said instant message;
on the recipient's computer system, determining if an animated character associated with said sender is stored on the recipient's digital communication system and if not,
sending a request from the recipient's computer system to said character server for said animated character, said request including said identification of said first user;
receiving, in response to said request, in the recipient's computer system and from said character server, the animated character;
displaying said animated character on the recipient's computer system; and delivering said content on the recipient's computer system through said animated character.

* * * * *